May 16, 1939.  S. M. ANDERSON  2,158,684
AIR CONDITIONING SYSTEM
Original Filed Oct. 22, 1936    3 Sheets-Sheet 2

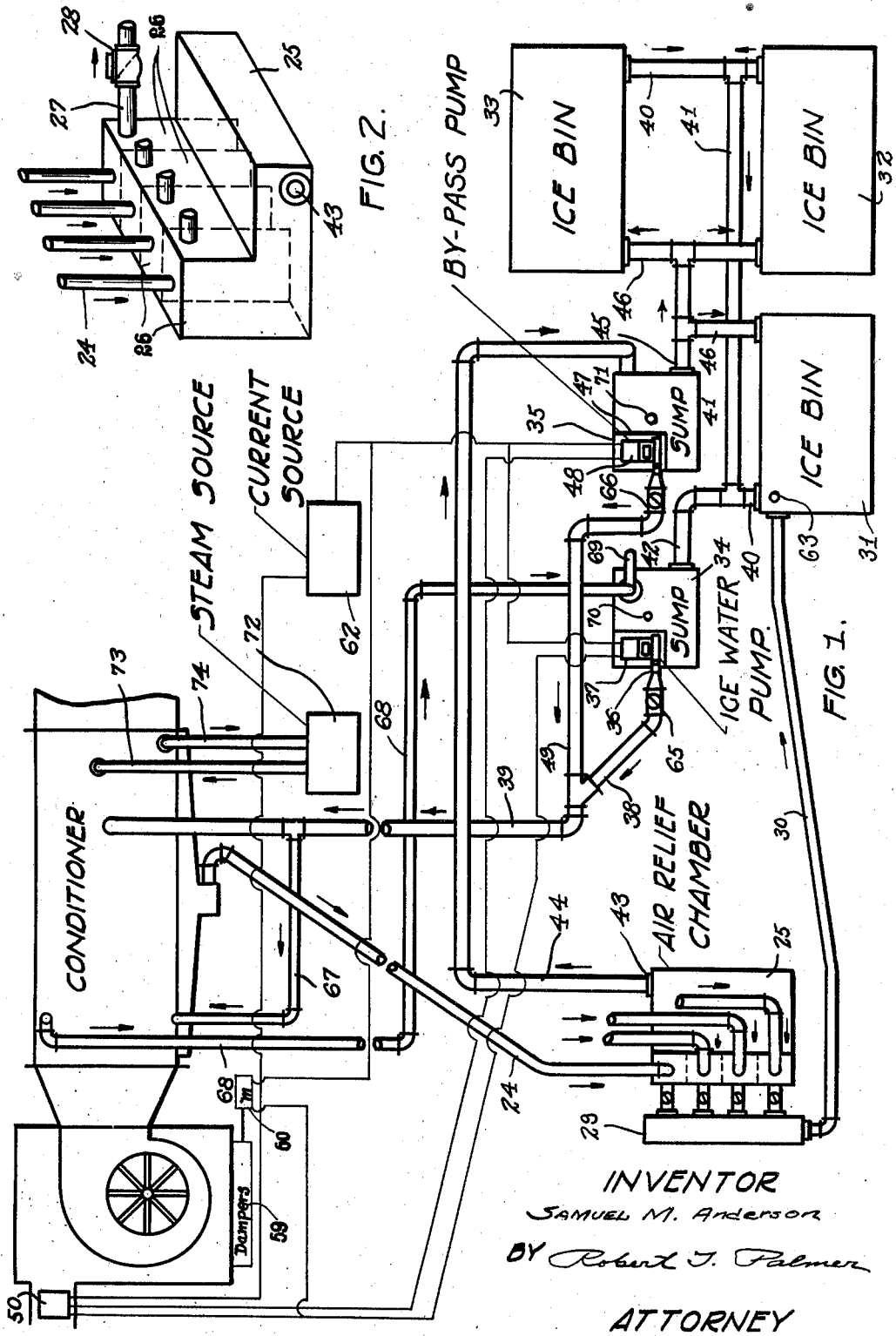

INVENTOR
SAMUEL M. ANDERSON
BY Robert J. Palmer
ATTORNEY

May 16, 1939.  S. M. ANDERSON  2,158,684

AIR CONDITIONING SYSTEM

Original Filed Oct. 22, 1936   3 Sheets-Sheet 3

INVENTOR
SAMUEL M. ANDERSON
BY Robert J. Palmer
ATTORNEY

Patented May 16, 1939

2,158,684

UNITED STATES PATENT OFFICE 2,158,684

AIR CONDITIONING SYSTEM

Samuel M. Anderson, Sharon, Mass., assignor to B. F. Sturtevant Company, Hyde Park, Boston, Mass.

Application October 22, 1936, Serial No. 107,019
Renewed September 30, 1938

17 Claims. (Cl. 62—117)

This invention relates to air conditioning systems and relates more particularly to air washer systems for passenger vehicles.

While air cooling and dehumidifying systems of the spray or washer type are recognized as being more effective than those utilizing heat exchange surfaces and so are almost universally used in buildings such as theatres, hospitals, etc., they have not been thought practical for passenger vehicles such as railroad passenger cars. This is due to the fact that there are many difficulties in the installation and operation of the spray systems on railroad cars, which are not present when such systems are installed in buildings.

According to a feature of this invention, an improved sump for spray conditioners is provided in which the varying levels of water due to train movement are compensated for.

According to another feature of this invention, provision is made for venting out the air entering the water recirculated from the air washer sump.

According to another feature of the invention, the system is adapted to be automatically converted from cooling by refrigeration, to cooling by evaporative cooling.

An object of the invention is to provide an efficient and effective air conditioning system of the spray type, for passenger vehicles.

Other and subsidiary objects of the invention will be apparent from the features referred to herein and from the drawings and the description which follows:

The invention will now be described with reference to the drawings, of which:

Fig. 1 is a diagrammatic view illustrating an assembled air conditioning system according to this invention;

Fig. 2 is a projected view of the air relief chamber of Fig. 1;

Figure 3:
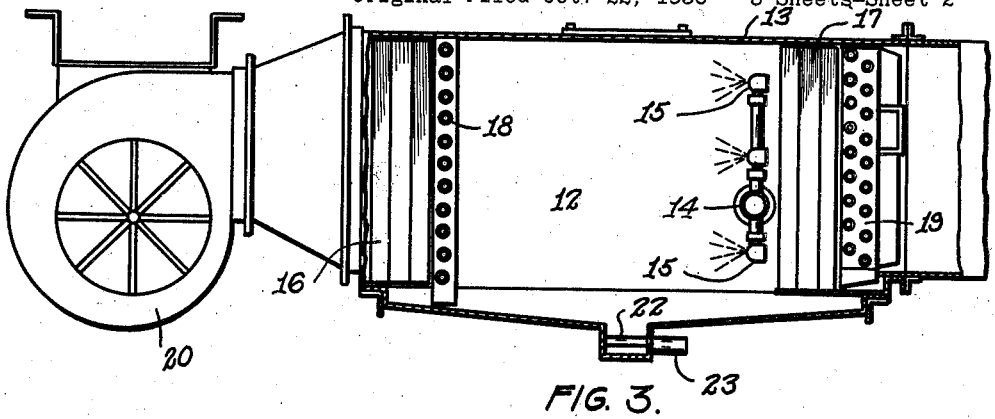
Fig. 3 is an elevation view in section of an air washer or spray unit according to this invention.

Referring first to Figs. 3, 4, 5 and 7, the air washer according to this invention will be described. The washer indicated generally by 12, contains within the casing 13, the water supply header 14, the spray nozzles 15, the eliminator plates 16 in advance with respect to air flow of the spray nozzles, the rear eliminator plates 17, the precooler coil 18 and the heater coil 19. The fans 20, driven by the electric motor 21, blow air through the washer.

Figure 4:
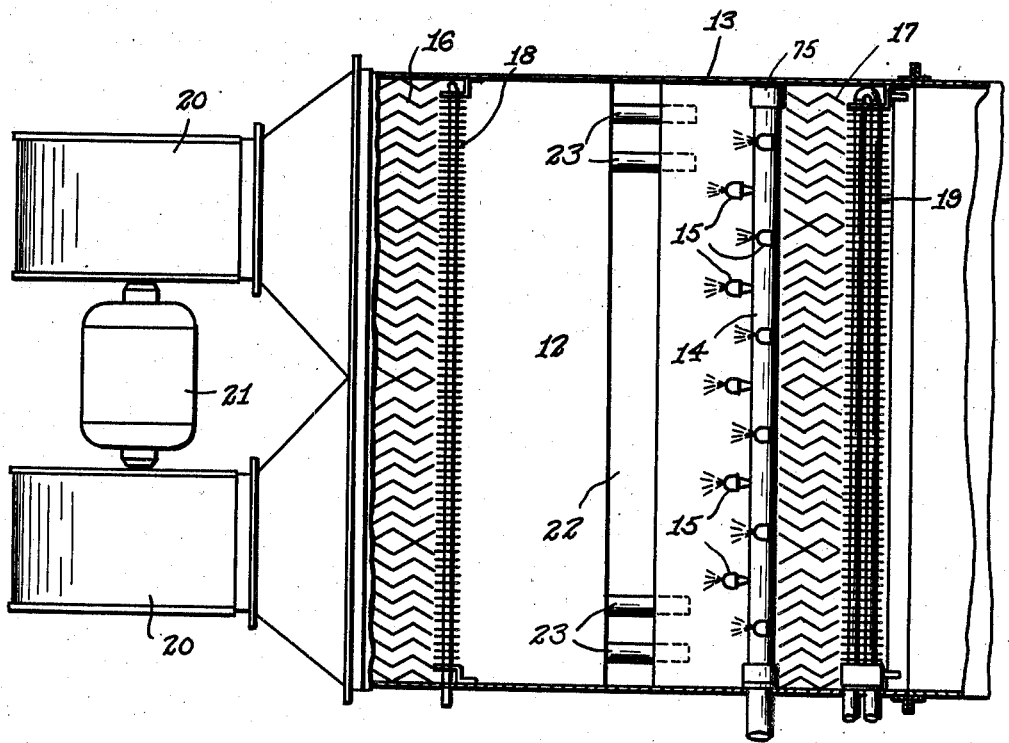
Fig. 4 is a plan view, looking downwardly, in section of the washer of Fig. 3.
Figure 5:
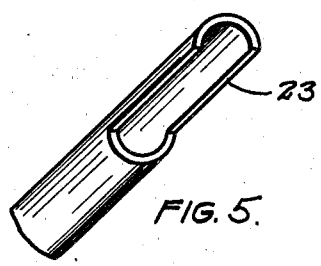
Fig. 5 is an enlarged projected view of one of the water discharge pipes in the sump of the washer illustrated by Figs. 3 and 4.

An important feature of the invention resides in the sump and in the water discharge arrangement, and is provided to lessen the chance of air leaving with the water regardless of how the washer may be tilted. There is provided transverse the washers the relatively narrow sump 22. Four recirculated water return outlets from the sump 22 are provided by the pipes 23 extending transverse the sump, two of which are arranged as shown by Fig. 4, adjacent one end of the sump and the other two of which are arranged adjacent the other end of the sump. The portions of the pipes 23 within the sump 22 have their lower halves removed as shown by Figs. 3 and 5. The portions of the pipes 23 so removed provide the outlets for the water discharged from the sump and are normally covered by water when the washer is level. The upper halves which are not removed, of the pipes 23 serve as shields for the outlets and aid in preventing air from leaving the outlets, with the water, by effectively lowering the outlets and by shielding them from direct exposure to the air. As shown by Fig. 3, there is insufficient room below the washer for the provision of the usual vertical outlet for the water from the washer sump.

As the washer is tilted as by the passage of the car in which it is mounted, around a banked curve, the two of the pipes 23 at the low side of the sump will serve to discharge water from the sump even though the other two are uncovered by the water.

The four pipes 23 are connected by the four pipes 24 to the air relief chamber 25, (Figs. 1 and 2) where any air passing with the water from the sump of the washer through the pipe 23, is separated from the water. The water from each outlet pipe 23 passes through its individual pipe 24 to a separate compartment 26 in the chamber 25. Each compartment 26 is connected by a pipe 27 and an air relief valve 28 to a header 29 (Fig. 1) which in turn is connected by the pipe 30 to the ice bin 31.

The ice bins 31, 32 and 33 are connected to each other and to the sumps 34 and 35. Water from the sump 34 is forced by the pump 36, driven by the electric motor 37 to the sprays in the conditioner through the pipes 38 and 39. Ice water is supplied to the sump 34 from the ice bins through the pipes 40, 41 and 42. The water returned from the sprays in the conditioner passes from the chamber 25 through the outlet 43 and the pipe 44 to the sump 35 from which it drains back into the ice bins through the pipes 45 and 46.

When the conditioner is supplied with water for evaporative cooling, as will be described later, the pump 47 driven by the motor 48 forces water from the sump 35 through the pipes 49 and 39 to the sprays in the conditioner. During the evaporative cooling, the pump 36 is inactive.

The system is designed to handle all outside air and to operate by evaporative cooling when the wet bulb temperature of the outside air is sufficiently low, say as low as 60° F.

Figure 6:
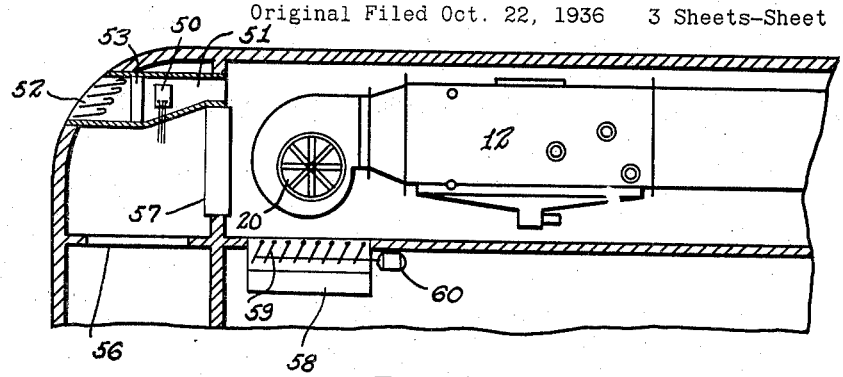
Fig. 6 is a side view of the washer arranged in the upper portion of a railroad passenger car.
Figure 7:
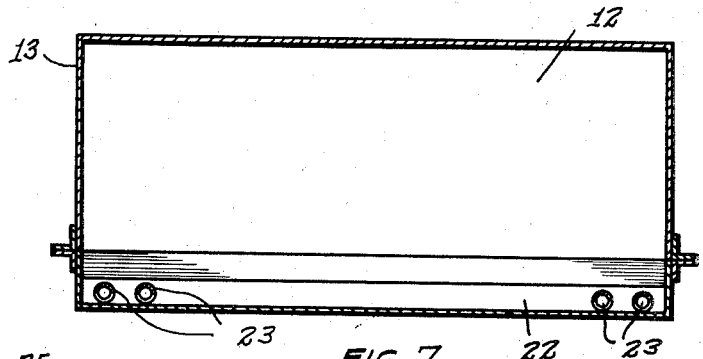
Fig. 7 is a sectional view taken transversely through the center of the washer of Figs. 3, 4 and 6.

The wet bulb temperature responsive device 50 (Figs. 1 and 6) is mounted within the insulated channel 51 communicating directly with the outside air. The channel 51 is preferably provided with the eliminators 52 and filter 53 and communicates with the inlets to the fans 20 through an opening above the filter 57 (Fig. 6). The instrument 50 is thus exposed directly to the influence of the outside air and is not effected by the sun effect or by heat from the car.

In operation, when the wet bulb temperature of the outside air is below the predetermined temperature selected for evaporative cooling, the wet bulb temperature responsive device 50 actuates circuits including the motor 37 and 48, and the current source 62 to deenergize the motor 37 and to energize the motor 48. It also acts to deenergize the damper control motor 60 causing it to close the recirculated air dampers 59 so that all outside air passes through the usual opening 56 in the vestibule of the car and through the filter 57 into the inlet of the conditioner. The motor 48 then drives the pump 47 to circulate water from the sump 35 through a course including the pipes 49 and 39, the spray nozzles 15 in the conditioner, the sump 22, the outlet pipes 23, the pipes 24, the compartments in the chamber 25, the outlet 43 and the pipe 44 back to the sump 35.

The ice bins, the sumps 34 and 35 and the air relief chamber 25 are mounted on the under side of the car. The water flow from the conditioner which is mounted in the upper portion of the car is by gravity through the pipes 24 to the chamber 25. When no air is permitted to enter the pipes 24, there is a syphon action, and the water flow is smooth and continuous. However, due to the motion of the car and varying positions of the railroad tracks, it is difficult to keep air from entering the pipes 24. The presence of air causes the water to flow from the sump 22 in surges, the water in advance of each surge building up to a sufficient height in the sump 22 to provide sufficient pressure to collapse the air columns in the pipes 24.

The air relief chamber 25 vents out any air entering the system with the water and in the water. The air and water entering the chamber 25 through the pipes 24 separate, the water flowing into the lower portion of the chamber 25 and passing out through the outlet 43 and pipe 44 to the sump 35. The air collects above the water level in the chamber 25 and is forced out by the pressure created by the water head resulting from the difference in height between the chamber 25 and the sump 22, through the pipes 27 and the air relief valves 28 into the sump 29, and thence into the ice bin 31. The ice bin 31 is provided with the air vent 63, through which the air in the system is dissipated into the atmosphere.

It might be stated that Fig. 1 of the drawings is purely diagrammatic and it is believed necessary therefore, to explain that the ice bins and the sumps 34 and 35 are all arranged at approximately the same level, and that the air relief chamber is arranged slightly above the sump 35 so that the water flows from the chamber 25 through the pipe 44 and into the sump 35 by gravity. The flow from the sumps 34 and 35 into and from the ice bins is by gravity. The flow is, of course, from the higher level to the lower level so that the water levels in the sumps and bins are maintained the same.

When the wet bulb temperature is too high for evaporative cooling to be effective, the control instrument 50 acts to deenergize the pump motor 48 driving the pump 47 and to energize the motor 37 driving the pump 36. At the same time, it energizes the motor 60 causing it to open the recirculated air dampers 59 to provide the desired amount of recirculated air. The pump 36 then draws water from the sump 34, which water is replaced by ice water from the bins 31, 32 and 33, and forces it to the sprays in the conditioner in a course including the pipes 40 and 41, the sump 34, the pipes 38 and 39 and the spray nozzles 15. The spray water is returned from the sump 22 in the conditioner to the air relief chamber and thence to the sump 35 and the ice bins, as explained in the foregoing.

During the supply by the pumps 36 and 37, of water to the spray nozzles in the conditioner, a portion of the water supplied by the pumps through the pipe 38, is shunted off through the branch pipe 67 to the precooler coil 18. The water after passing through the precooler coil returns through the pipe 68 to the sump 34. The sump 34 is provided with the overflow pipe 69. The sumps 34 and 35 are also provided with the air vents 70 and 71 to relieve to the atmosphere any air which may be present in the sumps.

The overflow 69 acts to maintain a desired water level in the sumps which are interconnected through the ice bins. For example, if the water in the sump 35 is too low, ice water from the bins flows in through the pipes 45 and 46. If the water level in the sump 35 is too high, the water flow is in the other direction, into the ice bins and thence into the sump 34 where the overflow maintains the desired level.

The air relief valves 28 permit air to be forced from the chamber 25, but do not permit water to flow backwardly into the chamber 25. Likewise, the stop valves 65 and 66 are provided to prevent water from flowing backwardly into the sumps 34 and 35 respectively.

Figure 9:
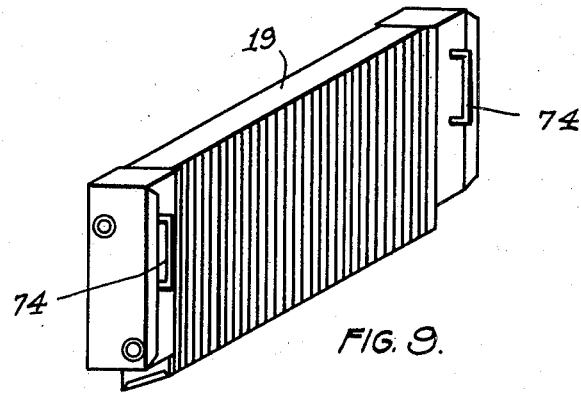
Fig. 9 is an enlarged view in projection of the heater of Figs. 3 and 4.

The heater 19 is provided with steam from the source 72 by the pipes 73 and 74. This heater is readily removable as shown by Figs. 3 and 9, through the front end of the conditioner, and is provided with the handles 74 to facilitate removal.

Figure 8:
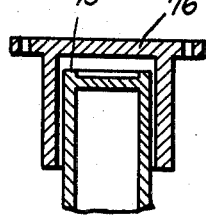
Fig. 8 is an enlarged detail view of the ends of the spray water supply header of Fig. 4.

Fig. 8 illustrates how the spray water supply header 14 is mounted at its closed end 75. The end 75 is arranged within the housing 76 so that it is free to expand or otherwise move along its length.

Figure 10:
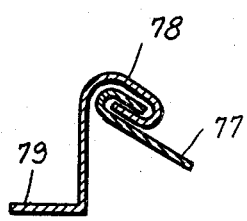
Fig. 10 is an enlarged detail view illustrating the way the eliminator plates of Figs. 3 and 4, are made leak proof.

Fig. 10 illustrates how the end plates of eliminator plates 16 and 17, shown by Figs. 3 and 4, are mounted to prevent the passage of water between the end plates and sides of the conditioner. With reference to Fig. 10, the ends 76 and 77 of the eliminator plates are bent over the ends of curved plates 78 which are attached at their bases 79 to the flat sides of the conditioner.

While one embodiment of the invention has been described for the purpose of illustration, it should be understood that the invention is not limited to the exact arrangement described, since many modifications may be made by those skilled in the art, without departing from the spirit of the invention.

What is claimed is:

1. An air conditioning system for a passenger vehicle, comprising an air washer unit, a water supply source, a pump for supplying water from said source to said unit, means for returning water from said unit to said source, and air relief means for separating the air from the water from said unit prior to its return to said source.

2. An air conditioning system for a passenger vehicle, comprising an air washer unit, a water supply source, a pump for supplying water from said source to said unit, means for returning water from said unit to said source, air separating means in said last mentioned means between said unit and said source, and means for dissipating into the atmosphere the air from said air separating means.

3. An air conditioning system for a passenger vehicle, comprising an air washer unit, said unit having a sump, a water supply source, means for supplying water from said source to said unit, a plurality of water discharge pipes having portions extending horizontally into said sump, said portions within said sump having their lower portions cut away to provide for the passage of water from said sump into said pipes, and means connecting the discharge sides of said pipes to said source.

4. An air conditioning system for a passenger vehicle, comprising an air washer unit, said unit having a sump, a water supply source, means for supplying water from said source to said unit, a plurality of water discharge pipes connecting horizontally into said sump, means connecting the discharge sides of said pipes to said source, and means for separating air from the water from said unit and for venting it to the atmosphere.

5. An air conditioning system for a passenger vehicle, comprising an air washer unit, said unit having a sump, a water supply source, means for supplying water from said source to said unit, a plurality of water discharge pipes having portions extending horizontally into said sump, said portions within said sump having their lower portions cut away to provide for the passage of water from said sump into said pipes, means connecting the discharge sides of said pipes to said source, and means for separating air from the water from said unit and for venting it to the atmosphere.

6. An air conditioning system for a passenger vehicle, comprising an air washer unit, a water supply source, a pump for supplying water from said source to said unit, means for returning water from said unit to said source, and an air relief chamber between said unit and said source.

7. An air conditioning system for a passenger vehicle, comprising an air washer unit, said unit having a sump, a water supply source, means for supplying water from said source to said unit, a plurality of water discharge pipes connecting horizontally into said sump, an air relief chamber connecting with the output side of said pipes, and means connecting said chamber and said source.

8. An air conditioning system for a passenger vehicle, comprising an air washer unit, said unit having a sump, a water supply source, means for supplying water from said source to said unit, a plurality of water discharge pipes having portions extending horizontally into said sump, said portions within said sump having their lower portions cut away to provide for the passage of water from said sump into said pipes, an air relief chamber connecting with the output side of said pipes, and means connecting said chamber and said source.

9. An air conditioning system for a passenger vehicle, comprising an air washer unit, said unit having a sump, a water supply source, means for supplying water from said source to said unit, a plurality of water discharge pipes connecting horizontally into said sump, a plurality of air relief chambers connecting with said pipes, and means connecting said chambers and said source.

10. An air conditioning system for a passenger vehicle, comprising an air washer unit, said unit having a sump, a water supply source, means for supplying water from said source to said unit, a plurality of water discharge pipes having portions extending horizontally into said sump, said portions within said sump having their lower portions cut away to provide for the passage of water from said sump into said pipes, a plurality of air relief chambers connecting with said pipes, and means connecting said chambers and said source.

11. An air conditioning system for a passenger vehicle, comprising an air washer unit, means for passing outside air through said unit for conditioning, a source of refrigerated water, a first pump, means connecting said pump to said source and to said unit for supplying refrigerated water to said unit, a sump, means for returning water from said unit to said sump, a second pump, means connecting said second pump to said sump and to said unit for recirculating water between said sump and said unit, and means for operating said first pump when the wet bulb temperature of said outside air is above a predetermined point and for operating said second pump when the wet bulb temperature of said outside air is below said predetermined point.

12. An air conditioning system for a passenger vehicle, comprising an air washer unit, means for passing air recirculated from the passenger space of said vehicle, through said unit for conditioning, means for passing outside air through said unit for conditioning, a source of refrigerated water, a first pump, means connecting said pump to said source and to said unit for supplying refrigerated water to said unit, a sump, means for returning water from said unit to said sump, a second pump, means connecting said second pump to said sump and to said unit for recirculating water between said sump and said unit, and means for operating said first pump when the wet bulb temperature of said outside air is above a predetermined point and for operating said second pump and for discontinuing the supply of recirculated air through said first mentioned means when the wet bulb temperature of said outside air is below said predetermined point.

13. An air conditioning system for a passenger vehicle, comprising an air washer unit, means for passing air recirculated from the passenger space of said vehicle into said unit for conditioning, means for passing outside air into said unit for conditioning, a first sump, a first pump for forcing water from said sump to said unit, a second sump, a second pump for forcing water from said second sump to said unit, a source of refrigerated water, means for supplying water from said source to said first sump, means for returning water from said unit to said second sump for recirculation, and means responsive to changes in the wet bulb temperature of the outside air entering said unit for selectively operating said pumps.

14. An air conditioning system for a passenger vehicle, comprising an air washer unit, a precooler coil in said unit, means for passing air recirculated from the passenger space of said vehicle into said unit for conditioning, means for passing outside air into said unit for conditioning, a first sump, piping connecting said sump and said unit, a first pump for forcing water from said sump to said unit, and to said coil, a second sump, piping connecting said unit and said second sump, a second pump for forcing water from said second sump to said unit, a source of refrigerated water, means for supplying water from said source to said first sump, means for returning water from said unit to said second sump for recirculation, means for returning the water from said coil to said first sump, and means responsive to changes in the wet bulb temperature of the outside air entering said unit for selectively operating said pumps.

15. An air conditioning system for a passenger vehicle, comprising an air washer unit, means forming a passage for outside air into said unit, a source of refrigerated water, means for supplying said unit with refrigerated water from said source, means for recirculating the water discharged from said unit for cooling the air by evaporative cooling, a device responsive to changes in the wet bulb temperature of air for operating said first mentioned means when the wet bulb temperature of the outside air is above a predetermined point and for operating said second mentioned means when the wet bulb temperature of the outside air is below a predetermined point, and means forming an insulated passageway around said device, connecting directly with the outside air.

16. Air conditioning apparatus for a railroad passenger car comprising a spray cooler, means for supplying said cooler with water for evaporative cooling, means forming a passageway for outside air into said cooler, means forming an insulated passageway for outside air into said cooler, and means in said insulated passageway responsive to changes in the wet bulb temperature of the air therein for controlling the operation of said cooler.

17. Air conditioning apparatus for a railroad passenger car having a vestibule, comprising a spray cooler, means for supplying said cooler with water for evaporative cooling, means forming a passageway for outside air from said vestibule into said cooler, means forming an insulated passageway for outside air into said cooler, and means in said insulated passageway responsive to changes in the wet bulb temperature of the air therein for controlling the operation of said cooler.

SAMUEL M. ANDERSON.